United States Patent [19]
Gersbach et al.

[11] Patent Number: 5,418,789
[45] Date of Patent: May 23, 1995

[54] FAST COMMUNICATION LINK BIT ERROR RATE ESTIMATOR

[75] Inventors: John E. Gersbach, Burlington; Ilya I. Novof, Essex Junction, both of Vt.; Joseph K. Lee, Raleigh, N.C.

[73] Assignee: International Business Machines Corporation, Armonk, N.Y.

[21] Appl. No.: 960,971

[22] Filed: Oct. 14, 1992

[51] Int. Cl.$^6$ .................... G06F 11/00; H04B 17/00
[52] U.S. Cl. ........................ 371/5.2; 375/224
[58] Field of Search ............... 371/5.2, 5.1; 375/10; 379/22; 370/100.1, 105.3; 340/825.16

[56] References Cited

U.S. PATENT DOCUMENTS

| | | | |
|---|---|---|---|
| 3,736,511 | 6/1973 | Gibson | 525/321 |
| 3,851,252 | 11/1974 | Karnaugh | 325/321 |
| 4,034,340 | 7/1977 | Sant'Agostino | 371/5.2 |
| 4,100,531 | 7/1978 | Kobayaski et al. | 375/10 |
| 4,247,938 | 1/1981 | Kurihara et al. | 371/5.2 |
| 4,580,263 | 4/1986 | Watanabe et al. | 371/5.2 |
| 4,583,235 | 4/1986 | Domer et al. | 375/11 |
| 4,615,038 | 9/1986 | Lim et al. | 375/14 |
| 4,628,507 | 12/1986 | Otani | 371/5.2 |
| 4,710,924 | 12/1987 | Chum | 371/4 |
| 4,759,035 | 7/1988 | McGary et al. | 375/12 |
| 4,788,696 | 11/1988 | Sakane et al. | 371/5.2 |
| 4,789,994 | 12/1988 | Randall et al. | 375/12 |
| 4,799,180 | 1/1989 | Suzuki | 364/724.2 |
| 4,800,572 | 1/1989 | Nossek et al. | 375/14 |
| 4,800,573 | 1/1989 | Cupo | 375/14 |

OTHER PUBLICATIONS

Takenaka et al., "Bit Error Rate Monitor for Four Phase PSK System", 1980 Intnl. Conf. on Communications (8–12 Jun. 1980).

Cariolaro, et al. "Moments for Correlated Digital Signals for Error Probability Evaluation" *IEEE Transactions on Information Theory*, vol. IT-21 No. 5, pp. 558–568.

"Base Digital Transmission", *Transmission Systems for Communications*, AT&T Bell Labs, pp. 703–714.

*Primary Examiner*—Emanuel T. Voeltz
*Assistant Examiner*—Eric W. Stamber
*Attorney, Agent, or Firm*—Calfee Halter & Griswold

[57] ABSTRACT

A system and method is provided for estimating the bit error rate of a data signal which has been reconstructed from a received data signal. The system comprises (i) logic for determining timing degradation and amplitude degradation of the received data signal; (ii) an actual bit error rate calculator for calculating the actual bit error rate of the reconstructed data signal; (iii) an instantaneous bit error rate calculator for estimating a bit error rate of the reconstructed signal using the timing degradation and the amplitude degradation; (iv) a first integrator for integrating the estimated bit error rate; (v) a comparator for comparing the integrated estimated bit error rate with the actual bit error rate and outputting an error signal which modifies the estimated bit error rate; and (vi) a second integrator for integrating the estimated bit error rate. The time constant associated with the second integrator is shorter than the time constant associated with the first integrator.

9 Claims, 4 Drawing Sheets

FAST COMMUNICATION LINK BIT ERROR RATE ESTIMATOR

TECHNICAL FIELD

The present invention relates generally to data communications networks and more particularly to a system for quickly estimating the bit error rate of data sent by a transmitter and received by a receiver in the network.

BACKGROUND OF THE INVENTION

In digital data transmission systems, data in binary form is transmitted over media such as wires or fiber optic cables from a transmission line transmitter to a transmission line receiver. The binary data waveform is degraded with respect to its timing and its amplitude as it propagates along the transmission media due to electrical noise and dispersion. This degradation of bits in the binary waveform results in incorrect interpretations by the receiver of bits sent by the transmitter across the transmission media. The incorrect interpretations are referred to as bit errors and the rate at which they occur within a communications network is referred to as a bit error rate.

In addition to variances in amplitude, the actual received data transmissions may be displaced in time from the true transmission. This time displacement, or intersymbol interference (ISI), of the transitions is caused by a new wave arriving at the receiver before the previous wave has reached its final value. Intersymbol interference (ISI) occurs due to pulse spreading caused by the dispersion of the transmission media. Variations in the clock rate and phase degradations (jitter) also distort the zero crossings resulting in decision time misalignment. When a pulse is transmitted in a given time slot, most of the pulse energy will arrive in the corresponding time slot at the receiver. However, because of this pulse spreading induced by the transmission medium, some of the pulse energy will progressively spread into adjacent time slots resulting in an interfering signal.

The transmission line receiver typically includes a regenerative repeater for reconstructing the transmitted data, regardless of electrical noise and transmission media degradations. The data pulse train is thereby permitted to travel through a dispersive and noisy medium, being repeatedly reconstructed at each repeater location to prevent degradation of the bits to the point where they are unrecognizable. In this manner, the bits remain impervious to most of the degradation introduced by the transmission medium, thereby reducing the bit error rate associated with the communications network. In the case of long distance, high capacity digital systems, the accuracy of the regenerative repeaters will often determine the overall effectiveness of the system.

Reconstruction of the originally transmitted signal by the repeater can be achieved by sampling the pulse train at a regular frequency equal to the bit rate, and at each sample instant making a decision of the most probable symbol being transmitted. Typically, a threshold level is chosen to which the received signal is compared. Above this threshold level a binary one is registered, and below the threshold a binary zero is registered. The regenerator circuit makes these zero or one decisions at times corresponding to the center of the bit intervals based on the clock information provided by a timing circuit. The center of the bit intervals generally correspond to the mid-points of the threshold level crossings of the pulse train. By setting the decision times midway between the threshold level crossings, the odds of accurately reconstructing the transmitted bit are increased, thereby decreasing the bit error rate.

Data communications networks typically include a link monitoring mechanism for measuring the bit error rate of the received data. The link monitoring usually is implemented via complex software which compares the received symbol codes with correct symbol codes to detect the bit errors. Because the bit error rate is low for most communications systems, given the state of the art and the presence of regenerative repeaters, a significant amount of time must pass before enough bit errors are accumulated to permit determination of an average bit error rate. However, it is desirable to detect an unacceptably high bit error rate as quickly as possible in order to permit re-routing of the binary data stream over an alternative communications link before a large number of errors are transmitted. In this manner, less data needs to be re-transmitted, thereby increasing the performance of the communications link.

It is an object of the present invention, therefore, to provide a high-speed, low-power mechanism for quickly estimating the bit error rate of a communications link to enhance the overall efficiency of the communications link.

SUMMARY OF THE INVENTION

A system for providing a nearly instantaneous estimate of the bit error rate (BER) of a reconstructed data signal in a data communications link is provided. The system is adapted to (i) receive a transmitted digital signal which may be degraded with respect to its amplitude and timing, (ii) accurately regenerate the originally transmitted data signal free of degradation, (iii) measure the actual bit error rate based on the regenerated data and (iv) calculate an instantaneous estimation of the bit error rate.

The system includes an amplification and regeneration circuit, a peak detect and averaging circuit, and a bit error rate estimator circuit. The amplification and regeneration circuit amplifies a degraded signal which is received by the system, and regenerates or reconstructs the data signal in its original form. The peak detect and averaging circuit controls the degree of amplification of the received signal by the amplification and regeneration circuit. The bit error rate estimator circuit measures the bit error rate using the regenerated data signal and calculates an instantaneous estimation of bit error rate.

Inputs to the bit error estimator circuit are (i) the output of the peak detect and averaging circuit, which is used to calculate changes in amplitude of the received signal ($\Delta A$), (ii) the output of a digital phase lock loop (DPLL) in the amplification and regeneration circuit, which is used to calculate variations in timing of the received signal ($\Delta T$), and (iii) the reconstructed data output by a regenerator in the amplification and regeneration circuit. The output of the bit error rate estimator circuit is a nearly instantaneous estimated bit error rate signal.

An actual BER calculator in the bit error rate estimator circuit determines the actual bit error rate for the regenerated data output by the regenerator. A comparator compares (i) the actual BER signal output by the actual BER calculator with (ii) an estimated BER provided by the integrated output of a first integrator.

The output of the comparator is an error signal which is defined by the difference between the estimated BER and the actual BER. The error signal is used to introduce a correction factor in the method in which the instantaneous BER is calculated by an instantaneous BER calculator. The instantaneous BER calculator provides an estimated bit error rate based on the $\Delta A$ and $\Delta T$ inputs, and modified by the error signal. The output of the instantaneous BER calculator is a statistical estimate of the bit error rate based on the average amplitude of the received data signal and the noise distribution associated with the signal.

The output of the instantaneous BER calculator is also integrated by a second integrator, which is provided with a shorter time constant than that of the first integrator. The second integrator is used to determine when there is a significant departure from the expected bit error rate, and outputs a nearly instantaneous estimated BER signal.

DETAILED DESCRIPTION OF THE PREFERRED EMBODIMENT

Figure 1A:
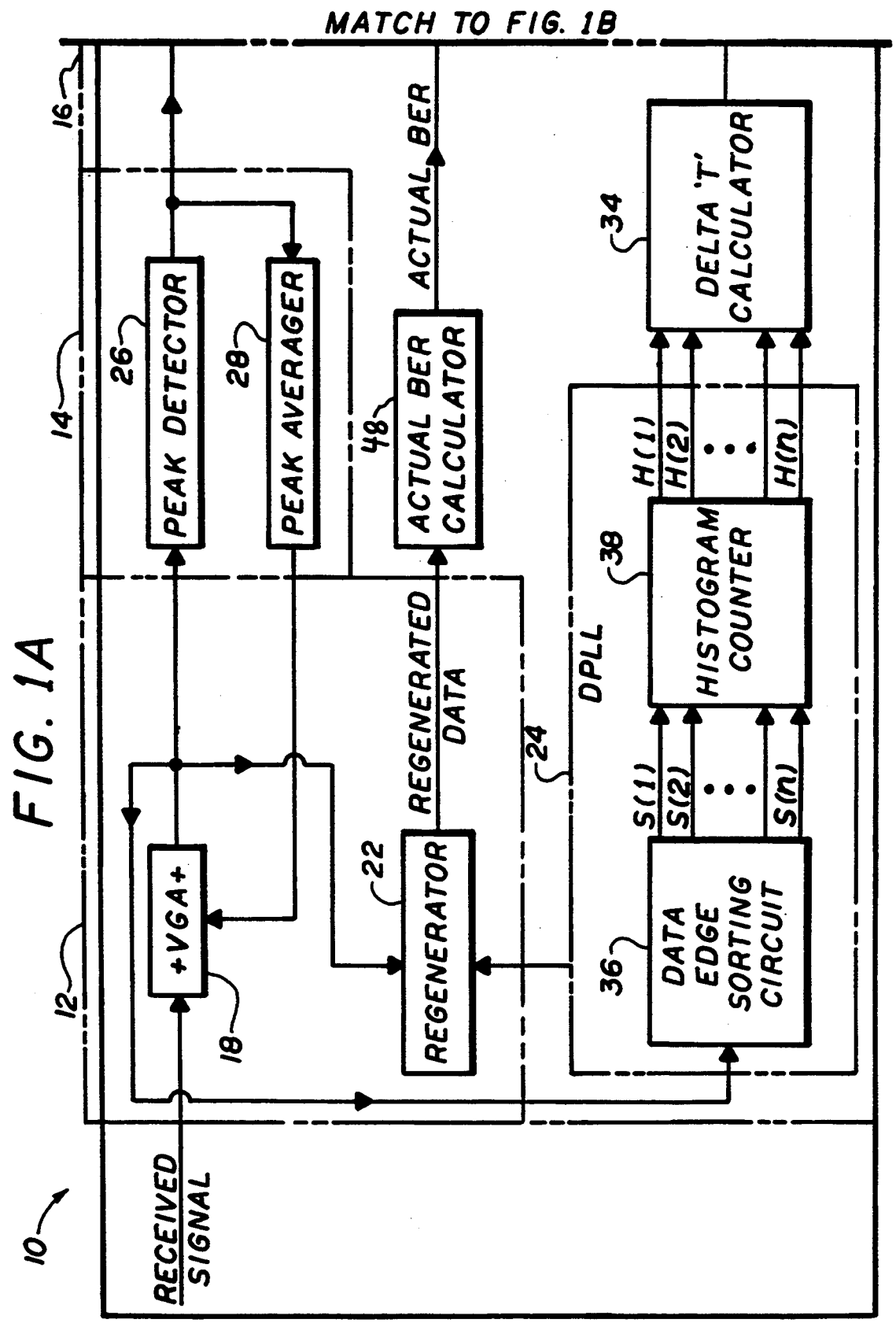
FIGS. 1A and 1B, taken together, are a schematic block diagram of a bit error rate estimation system constructed according to the principles of the present invention.
Figure 1B:
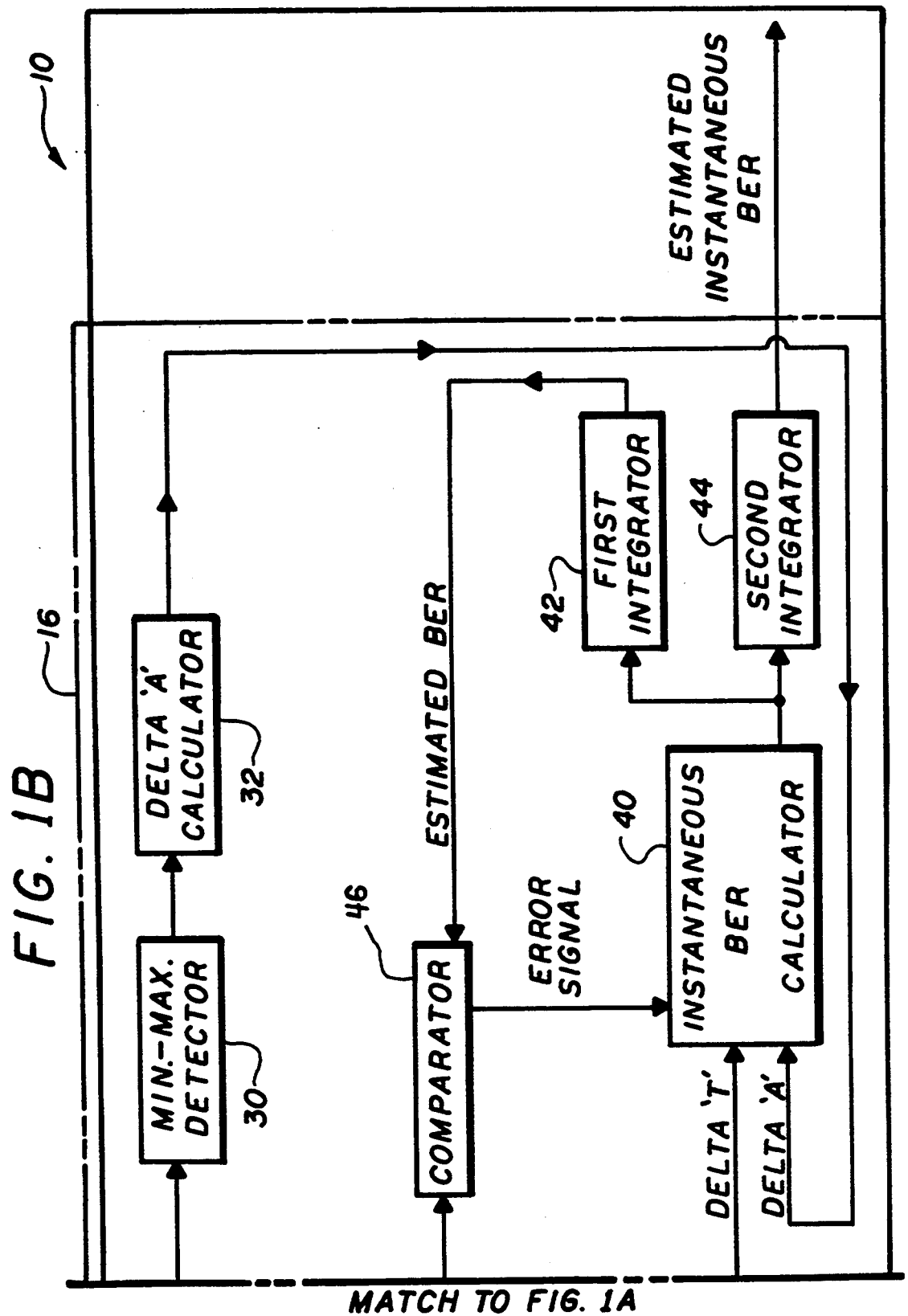

A block diagram of a system for quickly estimating the bit error rate of a communications link is shown in FIGS. 1A-1B. The system 10 is adapted to (i) receive a transmitted digital signal which may be degraded with respect to its amplitude and timing, (ii) accurately regenerate the originally transmitted data signal free of degradation, (iii) measure the bit error rate based on the regenerated data and (iv) calculate an instantaneous estimation of bit error rate. The system 10 includes an amplification and regeneration circuit 12, a peak detect and averaging circuit 14, and a bit error rate estimator circuit 16, descriptions of which will be provided hereinafter.

Figure 2A:
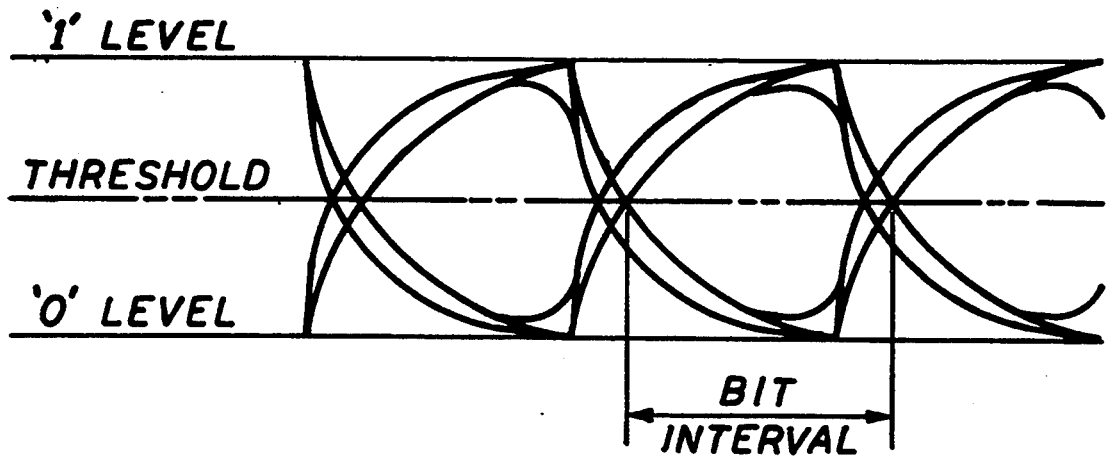
FIG. 2A is an illustration of superimposed data pulses received by the system of FIGS. 1A-1B.
Figure 2B:
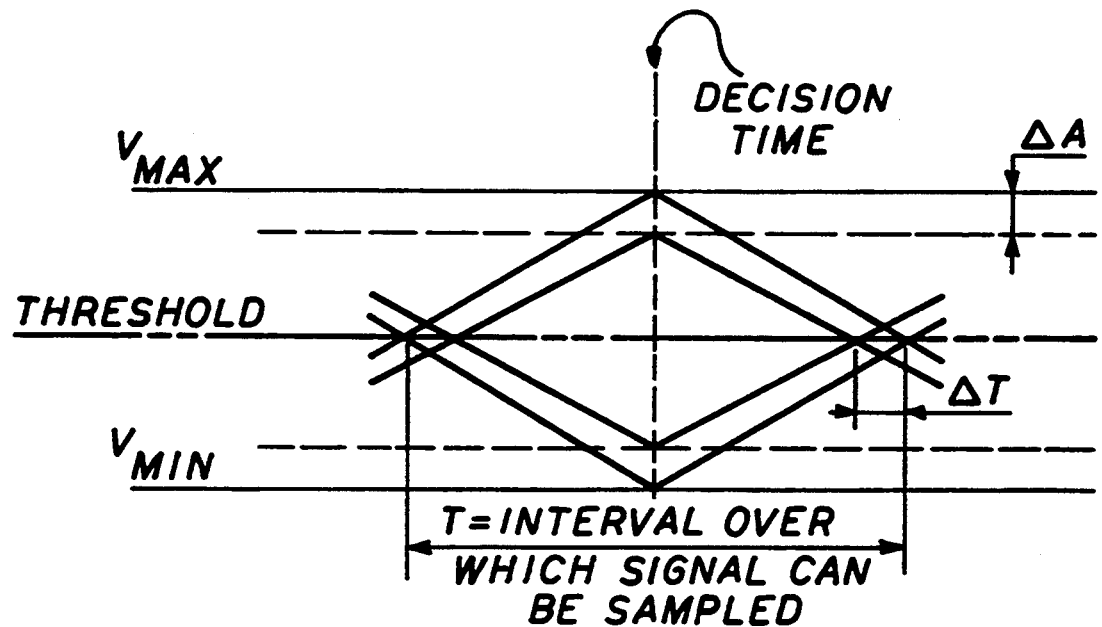
FIG. 2B is a simplified illustration of the diagram of FIG. 2A.

The degraded digital signals which are received by the system 10 are better shown in FIGS. 2A and 2B, frequently referred to as "eye diagrams", which represent the variances in amplitude and timing in the received signal. The eye diagram is a known method of assessing the data handling capability of a digital transmission system, and particularly the regenerative repeater, by examining the received waveform on an oscilloscope. The method may be used to evaluate the performance of both wire systems and optical fiber links.

As shown in FIG. 2A, the display obtained over a duration of two or more bit intervals, which results from superimposing all possible pulse sequences, has the shape of a human eye which is open. As shown in FIG. 2B, which is a simplified version of the eye diagram, the width of the eye opening defines the time interval over which the received signal can be sampled without error from intersymbol interference (ISI). The best time to sample the received waveform during this interval is when the height of the eye opening is largest, thereby providing the largest decision area. To regenerate the received pulse sequence without error, the eye must be open to indicate that a decision area exists, and the decision crosshair (provided by the decision time and the decision threshold lines) must be within this open area. The decision points must remain in the correct phase with respect to the received pulses, i.e., at or near the middle of the eye.

The effect of degradation of the pulses, caused by ISI and noise, is to reduce the size of, or possibly close, the eye. This degradation is shown as timing degradation ($\Delta T$) and as amplitude degradation ($\Delta A$) in FIG. 2B. The timing degradation $\Delta T$ includes timing jitter and offset of the decision time. The amplitude degradation $\Delta A$, represented by the difference between the top of the eye opening and the maximum signal level voltage, is due to intersymbol interference (ISI) and transmitter output variations and results in a reduction of the height of the eye opening. Accordingly, for reliable transmission it is essential that the eye is kept open, the margin against an error occurring being the minimum distance between the decision crosshair and the edge of the eye. The greater the eye closure becomes, the more difficult it is to detect the signal. The rate at which the eye closes as the sampling time is varied (that is, the slope of the eye pattern sides) determines the sensitivity of the system to timing errors. The possibility of timing errors increases as the slope becomes more horizontal.

Referring back to FIGS. 1A-1B, the amplification and regeneration circuit 12 amplifies the degraded signal which is received, and regenerates the data signal in its original form. The peak detect and averaging circuit 14 controls the degree of amplification of the received signal by the amplification and regeneration circuit. The bit error rate estimator circuit 16 measures the bit error rate using the regenerated data signal and calculates an instantaneous estimation of bit error rate.

The amplification and regeneration circuit 12 comprises a variable gain amplifier (VGA) 18, a regenerator 22 and digital phase lock loop (DPLL) 24. The input to the variable gain amplifier 18 is the received digital signal which is degraded with respect to its amplitude and timing due to dispersion introduced by the transmission medium and electrical noise. The variable gain amplifier 18 amplifies this degraded signal and outputs the amplified signal to the peak detector 26, the regenerator 22 and the DPLL 24. Accurate timing information is extracted from the amplified signal by the DPLL 24. This timing information is extracted by the DPLL 24 in a manner known in the art. The regenerator 22 matches this accurate timing information with the amplified output of the variable gain amplifier to reconstruct the received data in its originally transmitted form. The reconstructed data output by the regenerator is then further processed by the bit error rate estimator circuit 16 as will be further explained below.

The peak detect and averaging circuit 14 comprises a peak detector 26 and a peak averager 28. The peak detector 26 determines the individual peaks of the pulses in the waveform which are output by the variable gain amplifier 18, and outputs a voltage which is proportional to the peak amplitude to the peak averager 28. The peak averager controls the gain of the VGA 18 so that the average peak valued output by the VGA 18 is constant over time. The peak detector is reset after each bit interval, thereby enabling continuous peak amplitude detection. The peak detector outputs a voltage proportional to the peak value detected during the pulse cycle and provides this signal to the averager. The peak averager calculates the average value of these determined peaks, and outputs the average value to the variable gain amplifier 18 as a gain control signal. The gain control signal modifies the variable gain amplifier to force the amplitude of the output signal to fall within a preselected range. The average peak value is thus used to control the gain of the variable gain amplifier, thereby determining the extent of amplification of the degraded signal received by the amplification and regeneration circuit 12.

The peak detect and averaging circuit 14 comprising the peak detector 26 and the peak averager 28 form a closed loop feedback circuit for the amplification and regeneration circuit 12. By monitoring the output of the VGA 18, the peak detect and averaging circuit may provide continuous feedback to the variable gain amplifier so that its average output is constant over time. The regenerator 22 is thereby provided with a pulse train having pulses of similar amplitude, thereby enabling precise operation of the regenerator within the bit intervals of the original pulse train. As explained above, the regenerator decides whether a pulse is a binary one or zero at times corresponding to the center of the bit intervals based on the timing information provided by the DPLL 24. By providing the regenerator with timing pulses of similar amplitude, the DPLL 24 may more accurately determine the center of a particular bit interval.

The construction and operation of the regeneration system described heretofore is known in the art of data transmission and will therefore not be explained in further detail, other than the bit error rate estimator circuit 16, which will be explained in somewhat greater detail below.

The bit error rate estimator circuit 16 permits bit error rate estimation in high speed applications. Inputs to the bit error estimator circuit 16 are (i) the output of the peak detector 26, which is used to calculate $\Delta A$, (ii) the output of the VGA 18, and (iii) the regenerated data output of the regenerator 22, which is used to calculate the actual bit error rate detected in the received signal. The output of the bit error estimator circuit 16 is a signal representing a nearly instantaneous estimated bit error rate.

$\Delta A$, representing the change in amplitude between successive peaks in the received data, is calculated using the instantaneous peak data provided by the peak detector. The instantaneous peak data is directed to a min-max detector 30 which senses and stores minimum and maximum values of the peak amplitudes detected in each bit interval.

The min-max detector 30 may be implemented in either hardware or software or a combination thereof. In the preferred embodiment, the min-max detector 30 samples each of the peaks detected by the peak detector 26 and stores the minimum value $V_{min}$ and maximum value $V_{max}$ of those peaks detected. If a peak is detected by the peak detector the value of which falls between the current minimum and maximum values, the current minimum and maximum values remain unchanged. If, however, a new minimum or maximum is sensed, that value replaces the old minimum or maximum. Thus, the min-max detector 30 at any given time contains the most recent maximum and minimum values detected by the peak detector 26.

The difference in detected minimum and maximum peak values is calculated by $\Delta A$ calculator 32. $\Delta A$ is calculated as $[\Delta A = V_{max} - V_{min}]$ and normalized $\Delta A$ is calculated as [normalized $\Delta A = (V_{max} - V_{min})/(V_{max})$] (see FIG. 2B). The current value of $\Delta A$ is used by the bit error estimation circuit 16 to calculate the estimated bit error rate.

The means by which changes in the timing of the received signal are detected is provided by $\Delta T$ calculator 34, which receives as its input the output of DPLL 24. DPLL 24 is provided with a local clock (not shown) for establishing a plurality n of phase-delayed signals of the same frequency as the local clock signal. The sum of the delays of n phase-delayed signals corresponds to the period T of the local clock signal. Each of these delayed signals is shifted in time about 1/n of a local clock signal period T. The local clock signal period T corresponds to the period of the clock of the received data signal. For greater system measurement resolution, a greater number than n phase-delayed signals could be provided.

A data edge sorting circuit 36 provides an instantaneous indication of the approximate location in time of a data edge transition relative to the DPLL local clock signal. The data edge sorting circuit 36 receives each of the n phase-delayed local clock signals and establishes n time intervals per local clock period corresponding to these n signals. The leading edge of one time interval occurs precisely at the trailing edge of a previous interval. The sorting circuit 36 also receives the signal output by the VGA 18, senses the positive and negative going transitions of pulses in this signal, and sorts the positive and negative going transitions into these n time intervals. The positive and negative going transitions occurring during each interval, or data edge sorts S(1)—S(n), output by the sorting circuit 36 thus provide an indication of the time intervals during which these transitions are occurring, and the phase shift of these transitions with respect to corresponding positive and negative going transitions in the DPLL local clock signal.

A histogram counter 38 comprises a bank of n binary counters, one for each time interval established by the sorting circuit 36. Each of these individual counters counts the number of data edge sorts occurring during one of the established time intervals into which the local clock signal period is divided and stores this information. The histogram counters associated with each of the n equal time intervals thereby provide a statistical real time history distribution H(1)—H(n) of the time of transitions in the received signal.

Figure 3:
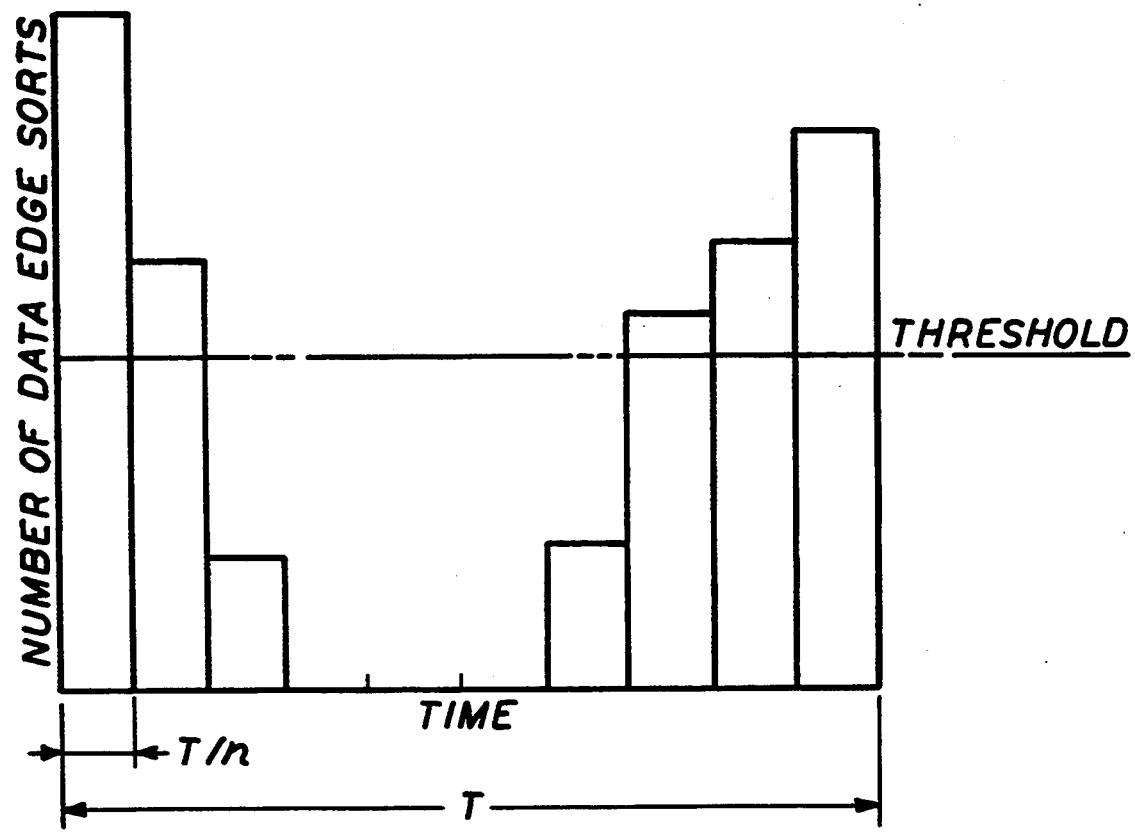
FIG. 3 is an illustration of a histogram produced by the system of FIGS. 1A-1B.

The $\Delta T$ calculator 34 reads the n counter values of the histogram counter 38, and develops a histogram, or real time history of the frequency distribution of the counted transitions in the n counters (see FIGS. 2A–2B). The histogram shows the number of data edge transitions occurring at various time intervals in the period T. In the histogram shown in FIG. 3, most transitions are recorded to have occurred within the first and last time intervals. A number of transitions above the threshold value have occurred in the first two and last three intervals. A number of transitions below the threshold value have occurred in the third through seventh intervals. No transitions have been recorded in the fourth through sixth intervals. Accordingly, the regenerator 22 uses this data edge sorting information provided by DPLL 24 to sample the amplified output of the VGA 18 at appropriate times to reconstruct the received data.

Based on the histogram, the $\Delta T$ calculator 34 determines the amount by which the received digital signal has been skewed during transmission. Normalized ΔT is calculated as the number of n time intervals having counts above a threshold value divided by n.

An instantaneous bit error rate may be calculated by an instantaneous BER calculator 40 based on values of ΔA and ΔT, and modified by an error signal which is output by comparing the actual bit error rate sensed in the regenerated data signal and an estimate of the bit error rate, as further described below. The output of the instantaneous BER calculator is integrated by a first integrator 42 having a first time constant and a second integrator 44 having a second time constant. The output of the first integrator 42 is the estimated bit error rate which is compared with the actual error rate to obtain the error signal. The output of the second integrator 44 provides a nearly instantaneous bit error rate signal which is used to identify radical departures from the expected bit error rate for the system 10.

An actual BER calculator 48 determines the actual bit error rate for the regenerated data output by the regenerator 22. The actual BER calculator 48 is implemented in hardware or software or a combination thereof and provides the logic to detect and measure actual errors in the regenerated data. The actual BER calculator 48 counts "bad" bits and outputs an analog or digital signal representing the actual rate at which bit errors occur.

A comparator 46 compares (i) the actual BER signal output by actual BER calculator 48 with (ii) the estimated BER provided by the integrated output of the first integrator 42. The first integrator 42 has a time constant close to that which it takes to complete the actual BER calculation at the actual BER calculator 48. Thus, the first integrator 42 outputs an estimated bit error rate signal which provides an estimate of the bit error rate of the system over a period of time similar to that upon which the actual BER is calculated.

The output of comparator 46 is an error signal which is defined by the difference between the estimated BER and the actual BER. The error signal is used to introduce a correction factor in the method in which the instantaneous BER is calculated at the instantaneous BER calculator 40. This closed loop process continues so that in a steady state operation, the estimated BER equals the actual BER.

The error signal output by the comparator 46 is the third input to the instantaneous BER calculator 40, along with the ΔA and ΔT inputs. The instantaneous BER calculator 40 provides an estimated bit error rate based on the ΔA and ΔT inputs, and modified by the error signal. The output of the instantaneous BER calculator 40 is a statistical estimate of the bit error rate based on the average amplitude of the received data signal and the noise distribution associated with the signal. The manner in which the statistical estimate of the BER is obtained assumes a Gaussian noise distribution, as disclosed in Cariolars, et al., *Moments of Correlated Digital Signals for Error Probability Evaluation*, IEEE Transations on Information Theory, Vol. IT-21, No. 5, September 1975 and *Transmission Systems for Communications*, AT&T Bell Laboratories, 1982, both references of which are incorporated by reference herein.

The bit error rate is calculated by the instantaneous BER calculator 40 using the following formula:

$$BER = 10^{-K} / \left( \frac{\Delta T}{T} + \frac{\Delta A}{A} \right)$$

where K is a coefficient. Upon initialization of the system, the initial value of K ($K_{init}$) depends on the initial values of A, T, ΔA and ΔT and the measured value of the bit error rate calculated by the actual BER calculator 48 $K_{init}$ is calculated as follows:

$$K_{init} = -\left( \frac{\Delta T}{T} + \frac{\Delta A}{A} \right)_{init} \times \log (BER)_{measured}$$

During system operation, the value of K periodically changes in incremental values of ΔK. Thus, the second value of $K = K_{init} + \Delta K$. Subsequently, the next value of $K = K + \Delta K$, and so on. The value of ΔK depends on the measured value of the bit error rate calculated by the actual BER calculator 48 and the estimated bit error rate signal output by the first integrator 42. ΔK is calculated as follows:

$$\Delta K = M[\log(BER)_{estimated} - \log(BER)_{measured}]$$

where M is a constant which depends on system hardware.

The output of the instantaneous BER calculator 40 is integrated by the first integrator 42, as described above, and also by the second integrator 44. The second integrator 44 is provided with a shorter time constant than that of the first integrator 42. The time constants of both integrators are selected based on the length (duration) of a burst of data received by the system 10 and recovered by the regenerator. For example, whereas the BER rate output by the actual BER calculator 48 and the first integrator 42 may be based on a unit of time corresponding to several kilobits of information, the second integrator output is typically based on a unit of time corresponding to tens of bits. The shortened time constant of the second integrator 44 is used to determine when there is a significant departure from the expected bit error rate, and outputs a nearly instantaneous estimated BER signal. The nearly instantaneous estimated BER signal can be used to quickly identify a problem with the data transmission network of which the system 10 is part. As a result, an accurate short term BER estimate is obtained on the integrated output of the second integrator 44.

Accordingly, the preferred embodiment of a bit error rate estimation system has been described. With the foregoing description in mind, however, it is understood that this description is made only by way of example, and that various changes may be implemented without departing from the true spirit of the invention as hereinafter claimed.

We claim:

1. A data regeneration and bit error rate estimation system for regenerating a received data signal and outputting a twice-integrated bit error rate signal which estimates a bit error rate of the regenerated signal, comprising: an amplifier for amplifying the received data signal;

digital phase lock logic for receiving said amplified signal and outputting timing information obtained from said amplified signal;

a regenerator for receiving said amplified signal and said timing information and matching said timing information with said amplified signal to output a regenerated data signal;

logic for determining timing degradation and amplitude degradation of the amplified signal independent of operation of said regenerator;

an actual bit error rate calculator for calculating an actual bit error rate of the regenerated data signal;

an instantaneous bit error rate calculator for outputting an estimated bit error rate signal which is an estimate of a bit error rate of the regenerated data signal using said timing degradation and said amplitude degradation;

a first integrator for integrating said estimated bit error rate signal and outputting a first-integrated bit error rate signal;

a comparator for comparing said first-integrated bit error rate signal with said actual bit error rate and outputting an error signal which modifies said estimated bit error rate signal; and a second integrator for integrating said estimated bit error rate signal after is has been modified by said comparator and for outputting a twice-integrated bit error rate signal.

2. The system of claim 1, wherein a time constant associated with said second integrator is shorter than a time constant associated with said first integrator.

3. The system of claim 2, wherein said digital phase lock logic includes a data edge sorting circuit which (i) senses positive and negative going transitions in said amplified signal, and (ii) sorts the positive and negative going transitions into a plurality of time intervals to provide an indication of the time intervals in which the positive and negative going transitions are occurring.

4. The system of claim 3, wherein said digital phase lock logic further comprises a plurality of histogram counters for counting the positive and negative going transitions occurring during each of said time intervals.

5. A bit error rate estimation system for outputting a twice-integrated bit error rate signal which estimates a bit error rate of a data signal which has been reconstructed by a regenerator from a received data signal, comprising:

logic for determining timing degradation and amplitude degradation of the received data signal independent of operation of the regenerator;

an actual bit error rate calculator for calculating an actual bit error rate of the reconstructed data signal;

an instantaneous bit error rate calculator for outputting an estimated bit error rate signal which is an estimate of a bit error rate of said reconstructed data signal using said timing degradation and said amplitude degradation;

a first integrator for integrating said estimated bit error rate signal and outputting a first-integrated bit error rate signal;

a comparator for comparing said first-integrated bit error rate signal with said actual bit error rate and outputting an error signal which modifies said estimated bit error rate signal; and a second integrator for integrating said estimated bit error rate signal after is has been modified by said comparator and for outputting a twice-integrated bit error rate signal.

6. The system of claim 5, wherein a time constant associated with said second integrator is shorter than a time constant associated with said first integrator.

7. The system of claim 6, wherein said logic for determining timing degradation is provided by digital phase lock logic circuitry.

8. A method of outputting a twice-integrated bit error rate signal which estimates a bit error rate associated with a data signal which has been reconstructed by a regenerator from a received data signal, comprising the steps of:

determining values of timing degradation and amplitude degradation of the received data signal independent of operation of the regenerator;

calculating an actual bit error rate of the reconstructed data signal;

outputting an estimated bit error rate signal which is an estimate of a bit error rate of said reconstructed data signal using said values of timing degradation and amplitude degradation;

integrating said estimated bit error rate signal with a first integrator and outputting a first-integrated bit error rate signal;

comparing said first-integrated bit error rate signal with said actual bit error rate in a comparator and outputting an error signal which modifies said estimated bit error rate signal; and integrating said estimated bit error rate signal with a second integrator after is has been modified by said comparator, and outputting a twice-integrated bit error rate signal.

9. The method of claim 8, wherein a time constant associated with said second integrator is shorter than a time constant associated with said first integrator.

* * * * *